United States Patent [19]

Bernazzani et al.

[11] Patent Number: 4,689,886

[45] Date of Patent: Sep. 1, 1987

[54] HAND HELD CAN OPENER

[75] Inventors: Richard J. Bernazzani, Roslindale; Domenic J. Bumbaca, Bedford, both of Mass.

[73] Assignee: The United States of America as represented by the Secretary of the Army, Washington, D.C.

[21] Appl. No.: 846,688

[22] Filed: Apr. 1, 1986

[51] Int. Cl.[4] .............................................. B23P 17/00

[52] U.S. Cl. ........................................ 30/416; 30/433

[58] Field of Search ................ 30/416, 433, 409, 448, 30/434, 436

[56] References Cited

U.S. PATENT DOCUMENTS

| | | | |
|---|---|---|---|
| 1,534,932 | 4/1925 | Edlund . | |
| 1,537,110 | 5/1925 | Edlund | 30/416 |
| 1,713,823 | 5/1929 | Edlund | 30/416 |
| 1,802,443 | 4/1931 | Nagano | 30/416 |
| 2,171,658 | 9/1939 | Lanphere | 30/416 |
| 2,237,418 | 4/1941 | Fender | 30/416 |
| 2,508,106 | 5/1950 | Edlund | 30/416 |

*Primary Examiner*—E. R. Kazenske

*Assistant Examiner*—Michael D. Folkerts

*Attorney, Agent, or Firm*—Lawrence E. Labadini

[57] ABSTRACT

An improved can opener having a handle with which the operator steadies the can being opened by a downward pressure on the handle to a flat surface beneath the can. At the bottom of the can opener is a protruding lip which prevents the can opener from lifting up and out of the can. This can opener is portable since it operates without being attached to any surface.

4 Claims, 4 Drawing Figures

HAND HELD CAN OPENER

The invention described herein may be manufactured, used, and licensed by or for the Government for governmental purposes without the payment to us of any royalty thereon.

BACKGROUND OF THE INVENTION

This invention is a modification to a commercial quality can opener of the type that provides for rotating a can on a horizontal support with a cutting blade to effect cutting of the can top. These can openers operate when fixedly attached with a mounting bracket to the side of a table. Cans are fed to the cutting blades by toothed feed wheels or rotors arranged so that actuation of the wheels or rotors will turn the can with the top of the can in contact with the cutting blade. The rotor is essentially perpendicular to the blade, unlike the standard household can opener where the blade and rotor are essentially parallel. These can openers have a turning handle or hand crank which performs two functions. The handle, when turned in a horizontal plane to the can, causes the rotor to feed the can surface to the cutting blade. This handle may also be pivoted in a vertical plane from a point at the top of the can opener post to engage the cutting blade with the can surface. Examples of this type of can opener are shown in U.S. Pat. Nos. 1,534,932; 1,713,823 and 2,508,106. In each of these patents, the can opener comes equipped with a long post by which a bracket similar to a vise holds the can opener to the side of a table. The present invention dispenses with the need for a table for mounting.

Two problems with these prior art can openers were found when they were used with the flat, rectangular, one-half steam table size cans the military recently adopted for use in field locations. Although the prior art can opener requires essentially permanent installation to a table, a table capable of holding the bracket is often not available. Therefore, it would be desirable to be able to operate a can opener apart from any table. In addition, it was found that the cans, which have a ¾-inch thick lip around the periphery of the top of the can, have a tendency for the blade to lift up and out of the can during the opening process as the feed wheel turns. This invention involves the solution found to these problems.

SUMMARY OF THE INVENTION

This invention is for a can opener with a handle which allows it to be used without a mounting bracket. This handle allows the operator to steady the can being opened by a downward pressure on the handle to a flat surface beneath the can. The second unique feature is the protruding lip on the bottom of the can opener which prevents the can opener from lifting up and out of the can during the opening process.

The handle is L-shaped when viewed from the side with a long rod extending from the rear side of the can opener opposite the cutting blade and a short rod at the end of the long rod extending downwards to contact a flat surface on which sits the can to be opened. The handle is long enough for the operator to place his hand on the far end of the long rod beyond the reach of the hand crank. Another feature of the handle is that a top view will show it to be curved or with an angle to afford stability during its operation.

DETAILED DESCRIPTION

Figure 1:
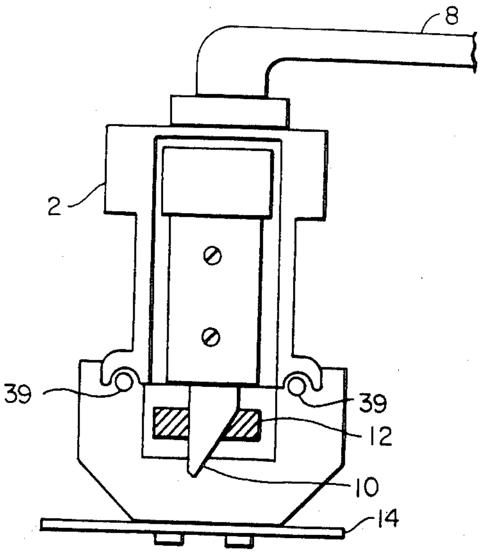
FIG. 1 is a front view of the can opener of this invention
Figure 3:
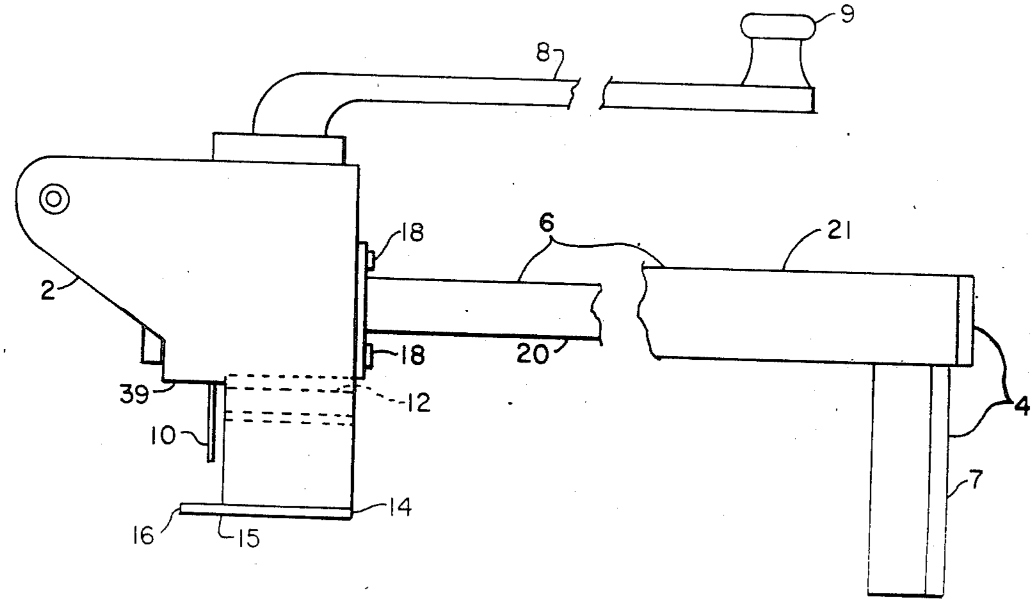
FIG. 3 is a side view showing the relationship of the cutting blade and the protruding lip.

The can opener 1 as shown in FIG. 1 has a housing 2 attached to which is handle 4. Handle 4 consists of a longer rod 6 and a relatively short rod 7 in perpendicular relationship as shown in FIG. 3. The hand crank 8 is attached to the top of the housing and has a knob 9 at the end. A cutting blade 10 and feed wheel 12 are shown as essentially perpendicular to each other. Attached to the bottom of the housing is a protruding lip 14, a flat metallic section, which should protrude a sufficient amount so that during the can opening process the protruding lips serves to secure to the underpart of the can lip and to prevent the blade from slipping out of the can. In this can opener, the protruding lip protrudes about ¼-inch as shown between points 15 and 16. The bottom surfaces of ears 39 and the upper surface of protruding lip 14 are about ¾-inch apart or about the thickness of the can lip. The short rod 7 of handle 4 extends 1-5/16 inch below the upper surface of protruding lip 14. Handle 4 may be attached to housing 2 by any conventional means such as a pair of screws 18 as seen in FIG. 3.

Figure 2:
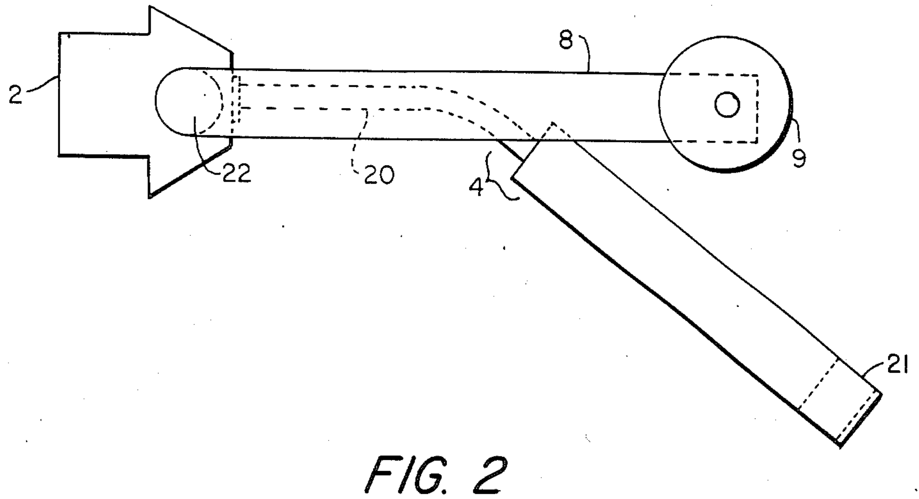
FIG. 2 is a top view of the can opener.

FIG. 2 shows a top view of can opener housing 2 with hand crank 8 and handle 4. Handle 4 bears an angle to lend stability in the operation of the can opener. The handle as seen in FIG. 2 consists of a round rod 20 and a rectangular type piece 21 with a greater surface area. Hand crank 8 is attached to the housing at point 22 which defines the axis around which the hand crank turns. Knob 9 defines a circle as the hand crank turns around its axis. The handle is to be of sufficient length so that when the hand crank turns, the user may hold onto and press downwards on the end of the long rod of the handle without the hand crank hitting the hand.

FIG. 3 is a side view of the can opener showing the relationship of cutting blade 10, ears 39 and protruding lip 14. In the type of can opener developed to be used on military tray packs, there should be about a ¾-inch gap between the bottom surfaces of ears 39 and the top surface of the protruding lip. Ears 39 extend from housing 2 in straddling relation to the lower end portions of cutting blade 10 and arm 36 and tend to prevent edgewise movement of arm 36 without any appreciable stress being imposed on pivot element 41 on which bell crank 33 is fulcrumed. A more important function of ears 39 is to serve as a guide for the upper edge of the can which is being turned in engagement with blade 10 by reason of the feed wheel, whereby the can will be maintained in a desirable position during the operation of the device. Cutting blade 10 must extend not more than ⅝-inch below the bottom surfaces of ears 39. Handle 4 is shown as a long rod and a short rod 7. The long rod is connected at one end to housing 2 and the other end to short rod 7. The long rod is in two sections 20 and 21 of different diameter.

Figure 4:
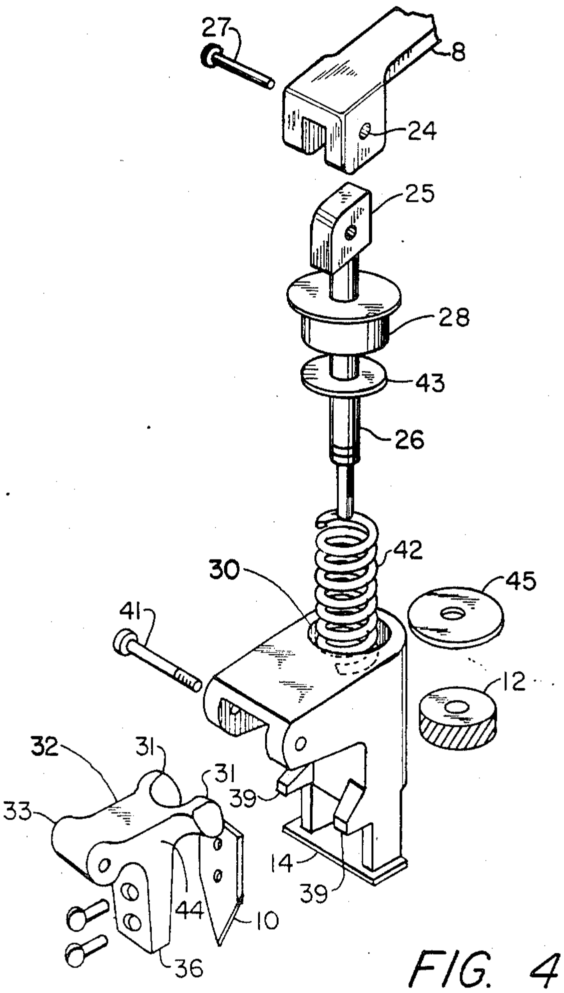
FIG. 4 is a view in perspective of the can opener showing the parts in detached relation.

FIG. 4 is a view in perspective of the can opener showing the parts in detached relation. Starting from the top of the figure, hand crank 8 has a pair of spaced cam ears 24 straddling an upstanding lug 25 on the upper end of shaft 26. Pivot element 27 retains the hand crank to the lug 25. Sleeve plunger 28 has a slightly reduced portion reciprocable in opening 30 and bears at its lower end on the forks 31 of the arm 32 of bell crank lever 33. An expansion spring 42 of coil formation encircles shaft 26 between washer 43 and bell crank lever 33 and urges arm 44 of bell crank lever 33 downwardly within the space in the upper part of housing 2. Disk or washer 45 is mounted on shaft 26 below housing 2 and in contact with feed wheel 12. The washer revolves when the handle is operated so that in whatever position the handle is stopped, the knife will fall to rest on the periphery of the washer, thereby leaving the proper clearance. The cam ears 24 are pivotally attached to the lug 25 by a horizontal pivot pin 27 and bear against the top of plunger 28. When hand crank 8 is in a vertical position, cam ears 24 will hold plunger 28 at the limit of its downward movement against the action of expansion spring 42 and arm 36 of bell crank lever 33 and the cutting blade 10 will be at the limit of their swinging movement away from housing 2 and feed wheel 12. This motion may be better understood by reference to FIGS. 1 and 2 of U.S. Pat. No. 1,713,823 which shows the hand crank in the vertical position (dotted lines) with the cutting blade positioned away from the housing and in the horizontal position (solid lines). Protruding lip is seen positioned at the bottom portion of the can opener in the present invention.

In use, the can which is to be opened is placed on a flat surface such as a box with the upper end portion of the body thereof in contact with the periphery of feed wheel 12 and with the tip of the cutting blade bearing against the can top at a slight distance from the marginal wall of the can top with the hand crank being in its vertical position at this time. A slight blow or pressure on the top of the hand crank along with some slight side to side movement is required for the cutting blade to puncture the can lid. The hand crank is then swung to the horizontal position shown in FIGS. 1, 2 and 3. The pressure on plunger 28 will be relieved so that the spring 42 will be permitted to function to cause upward movement of the plunger and consequent movement of the cutting blade radially inward in cutting engagement with a can top nearly to the marginal edge of the latter. This inward movement of the cutting blade also will tend to force the upper end portion of the can body firmly against the teeth of feed wheel 12. Protruding lip 14 will serve to maintain the can in this position by holding the lower end portion of the can body firmly in place during the can opening operation. Manipulation of the hand crank to cause rotation of shaft 26 and feed wheel 12 will cause the can to be turned on the flat surface in engagement with the cutting blade and the entire can top will be removed by the action of the cutting blade.

During the time that the hand crank is being turned by one of the can opener operator's hands, the operator's hand is on the end of the handle exerting a force downwards toward the table. This allows the can opener to remain stable while the hand crank is being turned.

Several of the dimensions of the can opener described herein are those necessary for the opening of the military half steam table size cans. These cans, known as tray packs, are 12 inches long, 10 inches wide and 2 inches deep. They have a $\frac{1}{4}$-inch wide shoulder running all around the tray pack at the $1\frac{1}{2}$-inch height. These cans were developed with these dimensions to provide for rapid and even heating of food and for ease of serving.

The gap between the protruding lip and the cutting blade may differ according to the dimensions of the lip on the can to be opened. Also, the dimensions of the handle may be adjusted for other types of cans. It will be understood that other modifications and embodiments of the invention may be made as fall within the scope of the claims.

We claim:

1. An improved can opener adapted to cut a can top by rotating the can having a vertical dimension and supported on a flat surface while holding the cutting blade in a fixed position through the can lid, said cutting blade being pivotally mounted to a housing and adapted to pierce and cut the can lid and having a feed wheel mounted to said housing and perpendicular to said cutting blade to rotate the can and having means to cause said cutting blade to pierce the top of the can and means to rotate said feed wheel to advance said can while in cutting engagement with said cutting blade to cut the top of said can adjacent its lip, and having guide means mounted to said housing to guide the upper edge of the can lip as the can is being rotated by said feed wheel, wherein the improvement comprises:
   - (a) a protruding lip mounted on said housing and spaced from said guide means to secure the can lip therebetween to prevent the cutting blade from slipping out of the can during rotation, and
   - (b) a handle mounted to said housing and extending perpendicular therefrom and adapted so that a portion thereof extends along the vertical dimension of the can and rests against said flat surface and is further adapted so that downward pressure of the user on the handle toward said flat surface holds the can opener in a stable position while the feed wheel is being rotated against said can.

2. An improved can opener as described in claim 1 wherein said handle is angled horizontally relative to the flat surface to afford stability during operation of the can opener.

3. An improved can opener as described in claim 2, wherein said handle extends a sufficient distance from said housing to allow the operator to place hand pressure on said handle beyond the reach of the means to rotate the feed wheel.

4. An improved can opener as described in claim 3, wherein said handle consists of a long rod and a short rod, the long rod being mounted at one end to said housing opposite the cutting blade and its opposite end is joined to the short rod in perpendicular relationship to the long rod.

* * * * *

UNITED STATES PATENT AND TRADEMARK OFFICE
CERTIFICATE OF CORRECTION

PATENT NO. : 4,689,886

DATED : 1 September 1987

INVENTOR(S) : Richard J. Bernazzani et al.

It is certified that error appears in the above—identified patent and that said Letters Patent is hereby corrected as shown below:

The front page of the patent at [75] Inventors should also contain the name of Peter D. Sheehan of Cambridge, MA.

Signed and Sealed this

Twentieth Day of September, 1988

*Attest:*

DONALD J. QUIGG

*Attesting Officer*

*Commissioner of Patents and Trademarks*